(12) United States Patent
Ovshinsky et al.

(10) Patent No.: US 6,193,929 B1
(45) Date of Patent: Feb. 27, 2001

(54) HIGH STORAGE CAPACITY ALLOYS ENABLING A HYDROGEN-BASED ECOSYSTEM

(75) Inventors: Stanford R. Ovshinsky, Bloomfield Hills; Rosa T. Young, Troy, both of MI (US)

(73) Assignee: Energy Conversion Devices, Inc., Troy, MI (US)

( * ) Notice: Subject to any disclaimer, the term of this patent is extended or adjusted under 35 U.S.C. 154(b) by 0 days.

(21) Appl. No.: 09/435,497

(22) Filed: Nov. 6, 1999

(51) Int. Cl.[7] .................... C22C 23/00; C22C 23/02; C01B 6/24
(52) U.S. Cl. .................... 420/402; 420/407; 420/900
(58) Field of Search .................... 420/900, 402, 420/407; 429/20, 59, 19

(56) References Cited

U.S. PATENT DOCUMENTS

| | | | |
|---|---|---|---|
| 5,199,972 | * 4/1993 | Bogdanovic | 75/255 |
| 5,501,917 | * 3/1996 | Hong | 429/101 |
| 5,616,432 | * 4/1997 | Ovshinsky et al. | 429/59 |
| 5,856,047 | * 1/1999 | Venkatesan et al. | 429/245 |
| 5,962,165 | * 10/1999 | Tsruta et al. | 429/218.2 |
| 5,964,965 | * 10/1999 | Schulz et al. | 148/420 |
| 5,976,276 | * 11/1999 | Sapru et al. | 148/403 |

FOREIGN PATENT DOCUMENTS

| | | | |
|---|---|---|---|
| 316968 | * 5/1989 | (EP) | . |
| 55-149101 | * 11/1980 | (JP) | . |
| 61199045 | * 8/1996 | (JP) | . |

* cited by examiner

Primary Examiner—Roy V. King
Assistant Examiner—Janelle Combs Morillo
(74) Attorney, Agent, or Firm—David W. Schumaker; Marvin S. Siskind; Philip H. Schlazer (57) ABSTRACT

Hydrogen propelled vehicles and fundamentally new magnesium-based hydrogen storage alloy materials which for the first time make it feasible and practical to use solid state storage and delivery of hydrogen to power internal combustion engine or fuel cell vehicles. These exceptional alloys have remarkable hydrogen storage capacity of well over 6 weight % coupled with extraordinary absorption kinetics such that the alloy powder absorbs 80% of its total capacity within 2 minutes at 300° C.

63 Claims, 8 Drawing Sheets

HIGH STORAGE CAPACITY ALLOYS ENABLING A HYDROGEN-BASED ECOSYSTEM

FIELD OF THE INVENTION

The instant invention relates generally to revolutionary new hydrogen storage alloys that are able, for the first time to realistically use the most ubiquitous, ultimate source of fuel for the next millennium and beyond, hydrogen. More particularly, there is described the use of such hydrogen storage alloys that make it possible to form a system that combines all the necessary attributes to enable the safe and efficient storage, transportation and delivery of hydrogen to, by way of example and not limitation, power internal combustion engine or fuel cell vehicles.

BACKGROUND OF THE INVENTION

This patent, for the first time, describes hydrogen storage alloys that have surmounted the chemical, physical, electronic and catalytic barriers that have heretofore been considered insoluble. The instant invention relates generally and specifically to solving the, up to now, unanswered problem of having sufficient hydrogen storage capacity with fast enough kinetics to permit the safe and efficient storage of hydrogen to provide fuel for a hydrogen based economy, such as powering internal combustion engine and fuel cell vehicles. The instant invention also solves the twin basic barriers which have held back the use of the "ultimate fuel," namely hydrogen storage capacity and a hydrogen infrastructure. The infrastructure problem can be solved once there is an acceptable storage material, since hydrogen can be shipped safely by boat, barge, train, trucks, etc. when in solid form, creating an instant infrastructure. The complete infrastructure system from "source to wheel" is the subject of copending U.S. application Ser. No. 09/444,810, filed Nov. 22, 1999. The use of the alloys of the instant invention also, because of the ultra-high capacity thereof, solve the problem of societal dependence on gasoline by providing an automobile with ranges in excess of 300 miles.

Here we specifically describe the basic means in which multi-elemental Mg based hydrogen storage materials are designed into hydrogen storage alloys by considering them as a system. These multi-elemental alloys can also be made in a non-equilibrium manner so that not only compositional disorder is produced, but also the desired local chemical order is formed. Specifically, one portion of the invention relates to modified Mg based hydrogen storage alloys. The inventors have for the first time produced Mg based alloys having both hydrogen storage capacities higher than about 6 wt. % and extraordinary kinetics. This revolutionary breakthrough has been made possible by considering the materials as a system and thereby utilizing chemical modifiers and the principles of disorder and local order, pioneered by Stanford R. Ovshinsky (one of the instant inventors), in such a way as to provide the necessary catalytic local order environments, such as surfaces and at the same time designing bulk characteristics for storage and high rate charge/discharge cycling. In otherwords, these principles allow for tailoring of the material by controlling the particle and grain size, topology, surface states, catalytic activity, microstructure, and total interactive environments for storage capacity.

As the world's population expands and its economy increase; the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations.

For nearly a century and a half, fuels with high amounts of carbon have progressively been replaced by those containing less. First wood, which is high in carbon, was eclipsed in the late $19^{th}$ century by coal, which contains less carbon. Then oil, with a lower carbon content still, dethroned "King Coal" in the 1960's. Now analysts say that natural gas, lighter still in carbon, may be entering its heyday, and that the day of hydrogen—providing a fuel with no carbon at all—may at last be about to dawn. As a result, experts estimate the world's economy today burns less than two-thirds as much carbon per unit of energy produced as it did in 1860.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention shortens that period to a matter of years. In the near term, hydrogen will be used in fuel cells for cars, trucks and industrial plants, just as it already provides power for orbiting spacecraft. But ultimately, hydrogen will also provide a general carbon-free fuel to cover all fuel needs.

As noted in recent newspaper articles, large industries, especially in America, have long been suspicious of claims that the globe is warming and have vociferously negated the science of climate change. Electric utilities have even tried to stoke fears among ordinary folk that international treaties on climate change would cut economic growth and cost jobs. Therefore, it is very encouraging that some of the world's biggest companies, such as Royal Dutch/Shell and BP Amoco, two large European oil firms, now state plainly what was once considered heresy: global warming is real and merits immediate action. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles. In this field, the assignee of the subject invention, has developed the Ovonic nickel metal hydride battery to make electric and hybrid vehicles possible.

Figure 1:
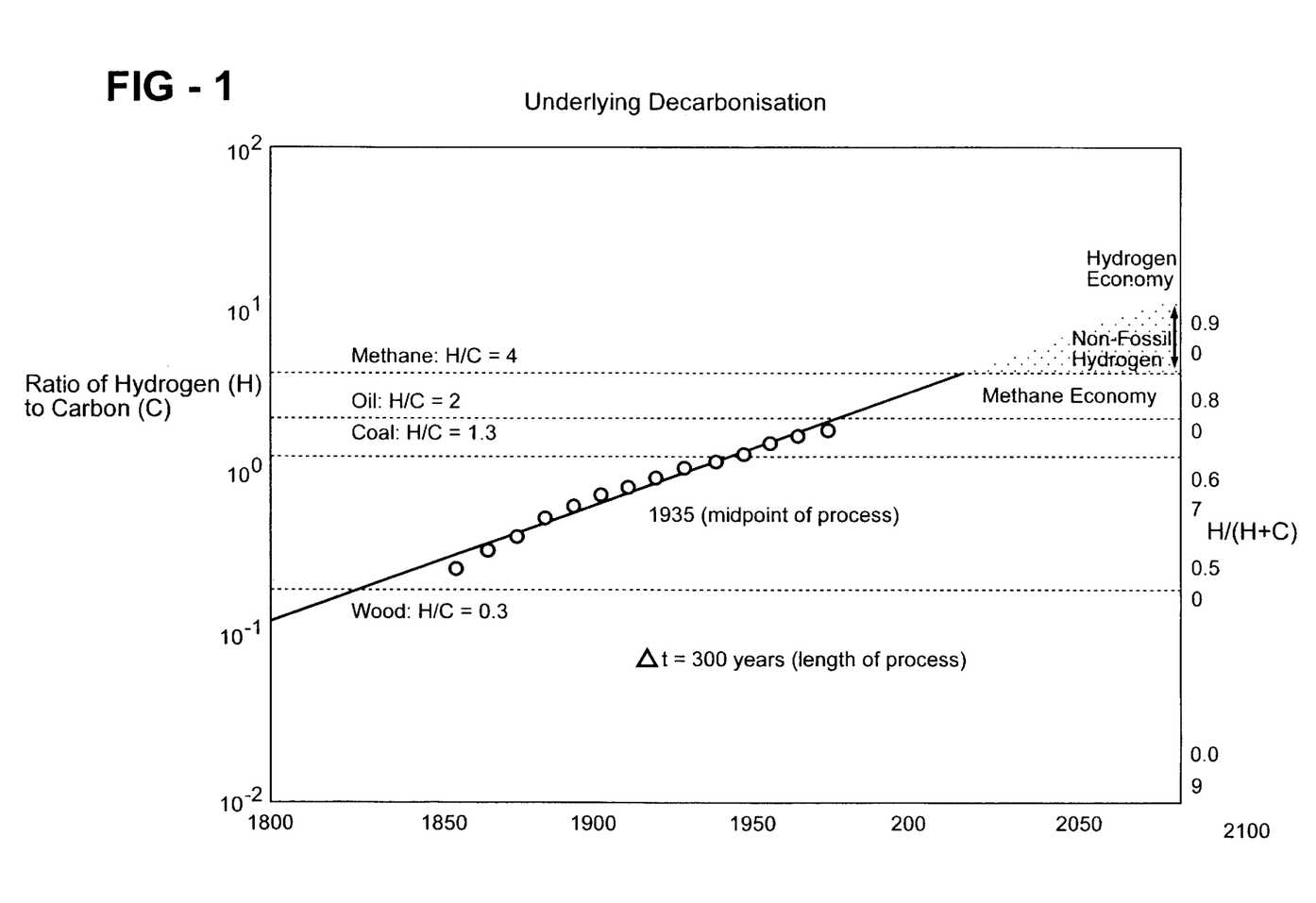
FIG. 1 is a graph having time plotted on the abscissa and the H/C ratio plotted on the ordinate, said graph demonstrating the movement of society toward carbon-free sources of fuel.

FIG. 1, taken from reliable industrial sources, is a graph demonstrating society's move toward a carbon-free environment as a function of time starting with the use of wood in the early 1800s and ending in about 2010 with the beginning of a "hydrogen" economy. In the 1800s, fuel was primarily wood in which the ratio of hydrogen to carbon was about 0.1. As society switched to the use of coal and oil, the ratio of hydrogen to carbon increased first to 1.3 and then to 2. Currently, society is inching closer to the use of methane in which the hydrogen to carbon ratio is further increased to 4. However, the ultimate goal for society is to employ a carbon-free fuel, i.e., the most ubiquitous of elements, pure hydrogen. The obstacle has been the lack of solid state storage capacity and infrastructure. The inventors of the subject patent application have made this possible by inventing a 7% storage material (further improvement very likely via additional research efforts) with exceptional absorption/desorption kinetics, that allow for the first time, a safe, high capacity means of storing, transporting and delivering pure hydrogen.

Hydrogen is the "ultimate fuel." In fact, it is considered by most to be "THE" fuel for the next millennium, and, it is inexhaustible. Hydrogen is the most plentiful element in the universe (over 95%) and was the first element created by the "Big-Bang." Hydrogen can provide an inexhaustible, clean source of energy for our planet which can be produced by various processes which split water into hydrogen and oxygen. The hydrogen can be stored and transported in solid state form. The instant patent application makes it possible to create a complete generation/storage/transportation/delivery system for such a hydrogen based economy. For example, economical, lightweight, triple-junction amorphous silicon solar cells solar cells (an invention pioneered by Stanford R. Ovshinsky, one of the instant inventors) such as those set forth in U.S. Pat. No. 4,678,679, (the disclosure of which is herein incorporated by reference) can be readily disposed adjacent a body of water, where their inherently high open circuit voltage can be used to dissociate water into its constituent gases, and collect the hydrogen so produced. Also, by placing these high efficiency solar panels on nearby farms, in water, or on land. Electricity can be generated to transport and pump the hydrogen into metal hydride storage beds that include the inventive metal hydride alloys disclosed herein. The ultra-high capacities of these alloys allow this hydrogen to be stored in solid form for transport by barge, tanker, train or truck in safe, economical form for ultimate use. Energy is the basic necessity of life and civilization for any society today and the use of hydrogen in the manner described herein as the basic source of energy would end wars fought for control of fossil fuels. Instead of "from well to wheel," the phrase now recited will be "from source to wheel."

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water, preferably via energy from the sun which is composed mainly of hydrogen and can itself be thought of as a giant hydrogen "furnace". Moreover hydrogen can be produced without the use of fossil fuels, such as by the electrolysis of water using nuclear or solar energy, or any other form of economical energy (e.g. wind, waves, geothermal, etc.). Furthermore, hydrogen, although presently more expensive than petroleum, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependancy on oil, etc., as well as providing a means of helping developing nations.

While hydrogen has wide potential application as a fuel, a major drawback in its utilization, especially in mobile uses such as the powering of vehicles, has been the lack of an acceptable lightweight hydrogen storage medium. Storage of hydrogen as a compressed gas involves the use of large and heavy vessels. In a steel vessel or tank of common design only about 1% of the total weight is comprised of hydrogen gas when it is stored in the tank at a typical pressure of 136 atmospheres. In order to obtain equivalent amounts of energy as compared with gasoline, a container of hydrogen gas weighs about thirty times the weight of a container of gasoline. Additionally, large and very expensive compressors are required to store hydrogen as a compressed gas.

Hydrogen also can be stored as a liquid. Storage as a liquid, however, presents a serious safety problem when used as a fuel for motor vehicles since hydrogen is extremely flammable. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen. Another drawback to storage as a liquid is the costly losses of hydrogen due to evaporation, which can be as high as 5% per day.

Storage of hydrogen as a solid hydride can provide a greater percent weight storage than storage as a compressed gas or a liquid in pressure tanks. Also, hydrogen storage in a solid hydride is safe and does not present any of the safety problems that hydrogen stored in containers as a gas or a liquid do because hydrogen, when stored in a solid hydride form, exists in it's lowest free energy state. A desirable hydrogen storage material must have a high storage capacity relative to the weight of the material, a suitable desorption temperature, good kinetics, good reversibility, resistance to poisoning by contaminants including those present in the hydrogen gas and be of a relatively low cost. If the material fails to possess any one of these characteristics it will not be acceptable for wide scale commercial utilization.

A high hydrogen storage capacity per unit weight of material is an important consideration in applications where the hydride does not remain stationary. A low hydrogen storage capacity relative to the weight of the material reduces the mileage and hence the range of the vehicle making the use of such materials impractical. A low desorption temperature (in the neighborhood of 300° C.) is desirable to reduce the amount of energy required to release the hydrogen. Furthermore, a relatively low desorption temperature to release the stored hydrogen is necessary for efficient utilization of the available exhaust heat from vehicles, machinery, or other similar equipment. A copending U.S. patent application Ser. No. 09/444,810 filed Nov. 22, 1999 describe a thermal management system in which temperatures in the 300° C. range can be economically employed.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to poisons to which the material may be subjected during manufacturing and utilization is required to prevent a degradation of acceptable performance.

The prior art metallic host hydrogen storage materials include magnesium, magnesium nickel, vanadium, iron-titanium, lanthanum pentanickel and alloys of these metals others. No prior art material, however, has solved the aforementioned problem which would make it suitable for a storage medium with widespread commercial utilization which can revolutionize the propulsion industry and make hydrogen a ubiquitous fuel.

Thus, while many metal hydride systems have been proposed, the Mg systems have been heavily studied since Mg can store over 7 weight % of hydrogen. While magnesium can store large amounts of hydrogen, its primary disadvantage is extremely slow kinetics. For example, magnesium hydride is theoretically capable of storing hydrogen at approximately 7.6% by weight computed using the formula: percent storage=H/H+M, where H is the weight of the hydrogen stored and M is the weight of the material to store the hydrogen (all storage percentages hereinafter referred to are computed based on this formula). Unfortunately, despite high storage capacity, prior art materials were useless because discharge of the hydrogen took days. While a 7.6% storage capacity is ideally suited for on board hydrogen storage for use in powering vehicles, it requires the instant invention to form Mg-based alloys operating on principles of disorder to alter previously unuseable materials and make them commercially acceptable for widespread use.

Magnesium is very difficult to activate. For example, U.S. Pat. No. 3,479,165 discloses that it is necessary to activate magnesium to eliminate surface barriers at temperatures of 400° C. to 425° C. and 1000 psi for several days to obtain a reasonable (90%) conversion to the hydride state. Furthermore, desorption of such hydrides typically requires heating to relatively high temperatures before hydrogen desorption begins. The aforementioned patent states that the $MgH_2$ material must be heated to a temperature of 277° C. before desorption initiates, and significantly higher temperatures and times are required to reach an acceptable operating output. Even then, the kinetics of pure Mg are unacceptable, i.e., unuseable. The high desorption temperature makes the prior art magnesium hydride unsuitable.

Mg-based alloys have been considered for hydrogen storage also. The two main Mg alloy crystal structures investigated have been the $A_2B$ and $AB_2$ alloy systems. In the $A_2B$ system, $Mg_2Ni$ alloys have been heavily studied because of their moderate hydrogen storage capacity, and lower heat of formation (64 kJ/mol)than Mg. However, because $Mg_2Ni$ has the possibility of a storage capacity of up to 3.6 wt. % hydrogen, researchers have attempted to improve the hydrogenation properties of these alloys through mechanical alloying, mechanical grinding and elemental substitutions. However, 3.6 wt. % is not nearly high enough and the kinetics are likewise insufficient.

More recently, investigators have attempted to form $MgNi_2$ type alloys for use in hydrogen storage. See Tsushio et al, Hydrogenation Properties of Mg-based Laves Phase Alloys, *Journal of Alloys and Compounds,* 269 (1998), 219–223. Tsushi et al. determined that no hydrides of these alloys have been reported, and they did not succeed in modifying $MgNi_2$ alloys to form hydrogen storage materials.

Finally, we have worked on high Mg content alloys or elementally modified Mg. For instance, in U.S. Pat. Nos. 5,976,276 and 5,916,381, Sapru, et al have produced mechanically alloyed Mg-Ni-Mo and Mg-Fe-Ti materials containing about 75 to 95 atomic percent Mg, for thermal storage of hydrogen. These alloys are formed by mixing the elemental ingredients in the proper proportions in a ball mill or attritor and mechanically alloying the materials for a number of hours to provide the mechanical alloy. While these alloys have improved storage capacities as compared with $Mg_2Ni$ alloys, they have low plateau pressures.

Another example of modified high Mg content alloy is disclosed in U.S. Pat. No. 4,431,561 ('561) to Ovshinsky et al., the disclosure of which is hereby incorporated by reference. In the '561 patent, thin films of high Mg content hydrogen storage alloys were produced by sputtering. While this work was remarkable in applying fundamental principles to drastically improve the storage capacities, it was not until the invention described herein that all necessary properties of high storage capacity, good kinetics and good cycle life were brought together.

In U.S. Pat. No. 4,623,597 ("the '597 patent"), the contents of which are incorporated by reference, one of the present inventors, Ovshinsky, described disordered multicomponent hydrogen storage materials for use as negative electrodes in electrochemical cells for the first time. In this patent, Ovshinsky describes how disordered materials can be tailor made to greatly increase hydrogen storage and reversibility characteristics. Such disordered materials are formed of one or more of amorphous, microcrystalline, intermediate range order, or polycrystalline (lacking long range compositional order) wherein the polycrystalline material may include one or more of topological, compositional, translational, and positional modification and disorder, which can be designed into the material. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed such Ovonic batteries to be utilized most advantageously as secondary batteries, but also as primary batteries and are used today worldwide under license from the assignee of the subject invention.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. The disordered material had the desired electronic configurations which resulted in a large number of active sites. The nature and number of storage sites was designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods therebetween resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of catalytically active sites for hydrogen dissociation and also of hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

The disorder described in the '597 patent can be of an atomic nature in the form of compositional or configurational disorder provided throughout the bulk of the material or in numerous regions of the material. The disorder also can be introduced into the host matrix by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve important improved and unique results, using the Ovshinsky principles of disorder on an atomic or microscopic scale.

One advantage of the disordered materials of the '597 patent were their resistance to poisoning. Another advantage was their ability to be modified in a substantially continuous range of varying percentages of modifier elements. This ability allows the host matrix to be manipulated by modifiers to tailor-make or engineer hydrogen storage materials with all the desirable characteristics, i.e., high charging/discharging efficiency, high degree of reversibility, high electrical efficiency, long cycle life, high density energy storage, no poisoning and minimal structural change.

The differences between chemical and thermal hydrides are fundamental. The thermal hydride alloys of the present inventions have been designed as a distinct class of materials with their own basic problems to be solved, which problems as shown in the following Table 1 are antithetical to those to be solved for electrochemical systems.

These same attributes have not, until now, been achieved for thermal hydrogen storage alloys. Therefore, there has been a strong felt need in the art for high capacity, low cost, light weight thermal hydrogen storage alloy materials having exceptionally fast kinetics.

TABLE 1

|  | Electrochemical Hydrogen Storage Material | Gas Phase (Thermal) Hydrogen Storage Material |
| --- | --- | --- |
| Mechanism | $H_2O$ molecule splits | $H_2$ dissociates at the material surface |
| Environment | Alkaline oxidizing environment (KOH electrolyte) | $H_2$ gas - very susceptible to poisoning by oxygen (inoperative in presence of KOH) |
| Kinetics | Hydrogen storage/release at room temperature | Hydrogen storage anywhere from 20° C. to 100° C. |
| Thermodynamics | Specific range of useful M-H bond strength | M-H bond strength of any degree is acceptable |
| Thermal Conductivity | Small effect | Large effect |
| Electrical Conductivity | Large effect | Small effect |
| Chemical Reaction | $M + H_2 + e^- \rightleftarrows MH + OH^-$ | $H_2(g) \rightleftarrows 2H$ |

SUMMARY OF THE INVENTION

The instant invention provides revolutionary hydrogen ecosystem made possible by utilizing new a high capacity, low cost, light weight thermal hydrogen storage alloy materials having fast kinetics in the form of a magnesium based hydrogen storage alloy powder. These alloys, for the first time make it feasible to use solid state storage and delivery of hydrogen to power a hydrogen based economy, and particularly to power mobile energy consumer applications such as internal combustion engine or fuel cell vehicles. The alloy contains greater than about 90 weight % magnesium and has a) a hydrogen storage capacity of at least 6 weight %; b) absorption kinetics such that the alloy powder absorbs 80% of it's total capacity within 5 minutes at 300° C.; c) a particle size range of between 30 and 70 microns, and d) a proper microstructure. More preferably the alloy powder has a hydrogen storage capacity of at least 6.5 weight % and most preferably at least 6.9 weight %. Also, the alloy powder more preferably absorbs 80% of it's total capacity within 2 minutes at 300° C. and most preferably within 1.5 minutes. Modifiers elements added to the magnesium to produce the alloys mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon.

BRIEF DESCRIPTION OF THE DRAWINIGS

DETAILED DESCRIPTION OF THE INVENTION

Figure 2:
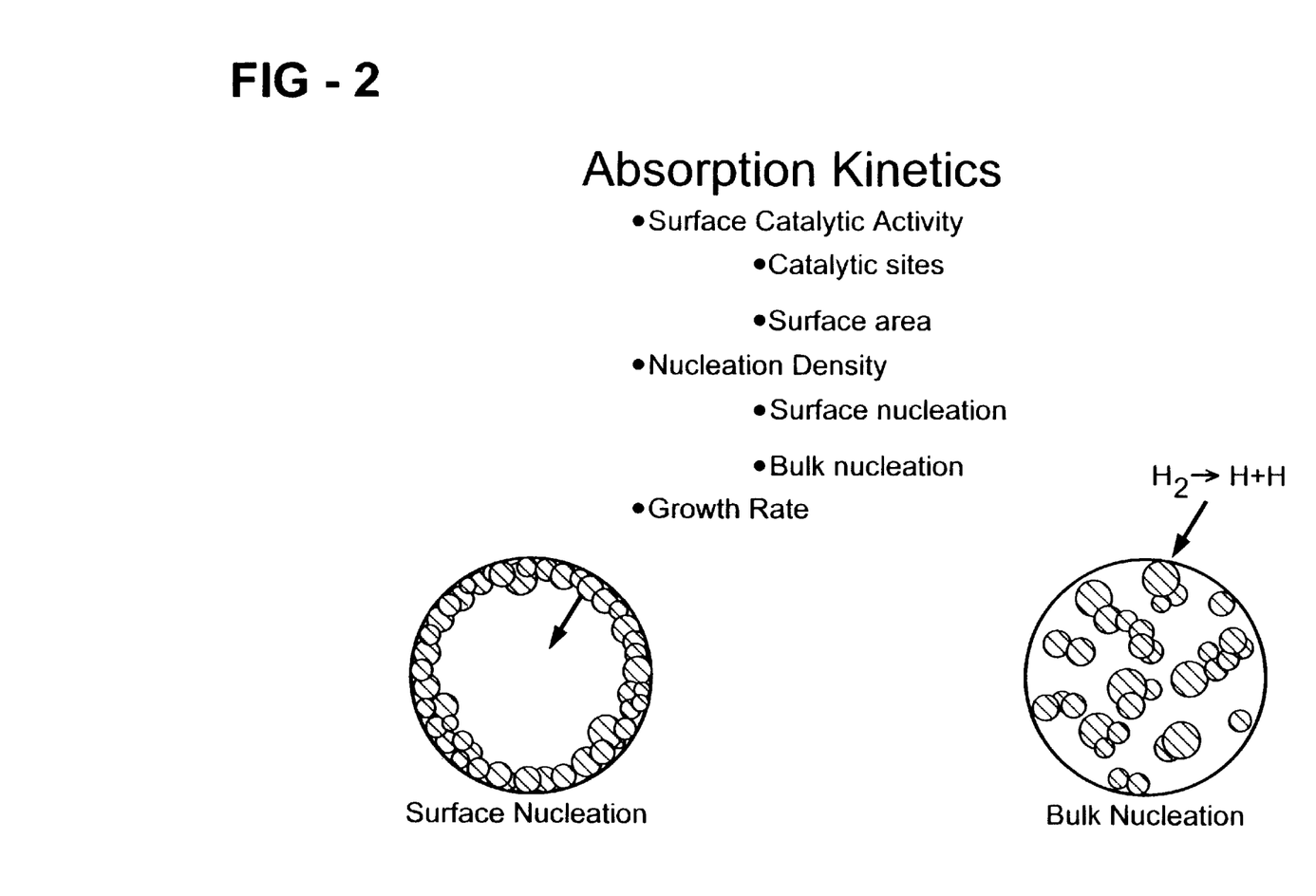
FIG. 2 is a graphical, stylistic depiction of the characteristics required by hydrogen storage alloys in order for such alloys to have the required kinetic properties required to propel fuel cell and internal combustion engines.

As discussed above, Mg stores large amounts of hydrogen. However, the kinetics of hydrogen storage in pure Mg are less than desirable. That is, while pure Mg can store upwards of 7.6 wt. % hydrogen, the Mg—H bond is very strong (75 kJ/mol) making release of the stored hydrogen difficult and therefore pure Mg is not a commercially viable hydrogen storage material. Thus, Mg alone is not sufficient, but utilizing the principle of disorder and local order, compositional (chemically induced) and structural disorder (rapid quench) can be used to create a different distribution of elements. This breakthrough has been made possible by examining the materials as a system and by utilizing chemical modifiers and the principles of disorder and local order, pioneered by Stanford R. Ovshinsky (one of the instant inventors), in such a way as to provide the necessary local order environments for storage. These principles allow for tailoring of the material by controlling the particle size, topology, surface states, catalytic ability (including catalitic sites and surface area), microstructure, nucleation and growth rate of crystallites both on the surface and in the bulk, and storage capacity both structural and interstitial. FIG. 2 is a graphical, stylistic depiction of the characteristics required by hydrogen storage alloys in order for such alloys to have the required kinetic properties required to propel fuel cell and internal combustion engines and schematically illustrates these concepts.

Specifically, small particles have unique properties that bridge the gap between crystalline and amorphous solids, i.e. small geometry gives rise to new physics. It is to be noted that 50 Angstrom particles are "mostly surface," thereby giving rise to new topologies and unusual bonding configurations. Also, 21% of all atoms in a 50 Angstrom particle are on the surface and another 40% are within one atom of the surface. Thus compositional disorder in multi-element micro-alloys is large in small particles, e.g. in a 50 Angstrom particle, each element in a 10 element alloy will show 3% variation in concentration just due to statistics. With such small particles, quantum confinement effects are apparent and band structure effects are disturbed.

The instant inventors have found that, by applying the principles of atomic engineering and tailoring of the local environment, magnesium can be modified to store more than 6 wt. % hydrogen, with significantly increased kinetics which allows for economic recovery of the stored hydrogen. The increased kinetics allows for the release of hydrogen at lower temperatures, thus increasing the utility of metal hydride storage in hydrogen based energy systems. Thus the instant alloys provide commercially viable, low cost, low weight hydrogen storage materials.

In general the alloys contain greater than about 90 weight % magnesium, and contain at least one modifier element. The at least one modifier element creates a magnesium based alloy which is capable of storing at least 6 weight % hydrogen and which is capable of absorbing at least 80% of the full storage capacity of hydrogen in under 5 minutes at 300° C. More preferably the modified alloy stores at least 6.5 weight % hydrogen and is capable of absorbing 80% of the full storage capacity of hydrogen in under 2 minutes at 300° C. Most preferably the modified alloy stores at least 6.9 weight % hydrogen and is capable of absorbing 80% of the full storage capacity of hydrogen in under 1.5 minutes at 300° C. The modifier elements mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon. A few examples will help to illustrate the instant invention.

EXAMPLE 1

A modified Mg alloy having the designation FC-10 was made which has the composition: 91.0 wt. % Mg, 0.9 wt. % Ni, 5.6 wt. % Al, 0.5 wt. % Y and 2.0 at % Mm. The individual raw alloying elements were mixed in a glove box. The mixture was placed in a graphite crucible and the crucible was placed in a furnace. The crucible had a 2.0 mm boron nitride orifice at the bottom thereof which is plugged by a removable boron nitride rod. The furnace was pumped down to very low pressure and purged three times with argon. The argon pressure withing the furnace was brought up to 1 psi and kept at this pressure as the crucible was heated to 600° C. Once the melt was ready, the boron nitride rod was lifted and argon was injected into the furnace under pressure. The molten alloy flowed out of the graphite crucible through the boron nitride orifice and onto a non-water-cooled, horizontally spinning, copper wheel. The wheel, which spins at about 1000 rpm, solidifies the molten alloy into particles which then bounce off a water-cooled copper cap which covers the spinning wheel, and drop into a stainless steel pan where they gradually cool. Five grams of the solidified alloy flakes were mixed with 100 mg of graphite grinding aid. The mixture was mechanically ground for 3 hours. The ground alloy was then classified by sieving to recover material having a particle size of between 30 and 65 microns. This alloy has a storage capacity of about 6.5 wt. % hydrogen and absorbs 80% of the maximum capacity in less than 5 minutes at a temperature of about 300° C. Other details of the alloy properties are presented below.

EXAMPLE 2

A modified Mg alloy having the designation FC-76 was made which has a composition: 95.6 wt. % Mg, 1.6 wt. % Ni, 0.8 wt. % Si and 2.0 wt % Mm. The alloy was formed in the same manner as Example 1, however, the furnace temperature was 850° C. and the orifice size was 2.5 mm. This alloy has a storage capacity of about 6.9 wt. % hydrogen and absorbs 80% of the maximum capacity in less than 1.5 minutes at a temperature of about 300° C. Other details of the alloy properties are presented below.

EXAMPLE 3

A modified Mg alloy having the designation FC-86 was made which has a composition: 95 wt. % Mg, 2 wt. % Ni and 3.0 wt % Mm. The alloy was formed in the same manner as Example 1, however, the furnace temperature was 750° C. and the wheel speed was 1400 rpm. This alloy has a storage capacity of about 7 wt. % hydrogen and absorbs 80% of the maximum capacity in less than 2.3 minutes at a temperature of about 275° C. Other details of the alloy properties are presented below.

The alloys of the instant invention are unique in their combination of high storage capacity and excellent absorption/desorption kinetics. The instant inventors have found that a combination of both alloy composition and particle size of the hydrogen storage material have a significant effect on the kinetics. That is, the instant inventors have found that the kinetics of the material (regardless of specific composition) improve with decreasing particle size. Specifically, the instant inventors have found that materials having a particle size of between about 30 and 70 microns are the most useful. This particle size gives excellent kinetics while still being capable of being manufactured. Increasing particle size eases manufacturing, but drastically reduces the kinetics of the material, while decreasing particle size is nearly impossible because of the high ductility of these Mg based alloys. In fact, the use of gas atomization may be required in industry to manufacture bulk quantities of the particulate alloy specifically because the alloys are too ductile to be ground efficiently.

Figure 3:
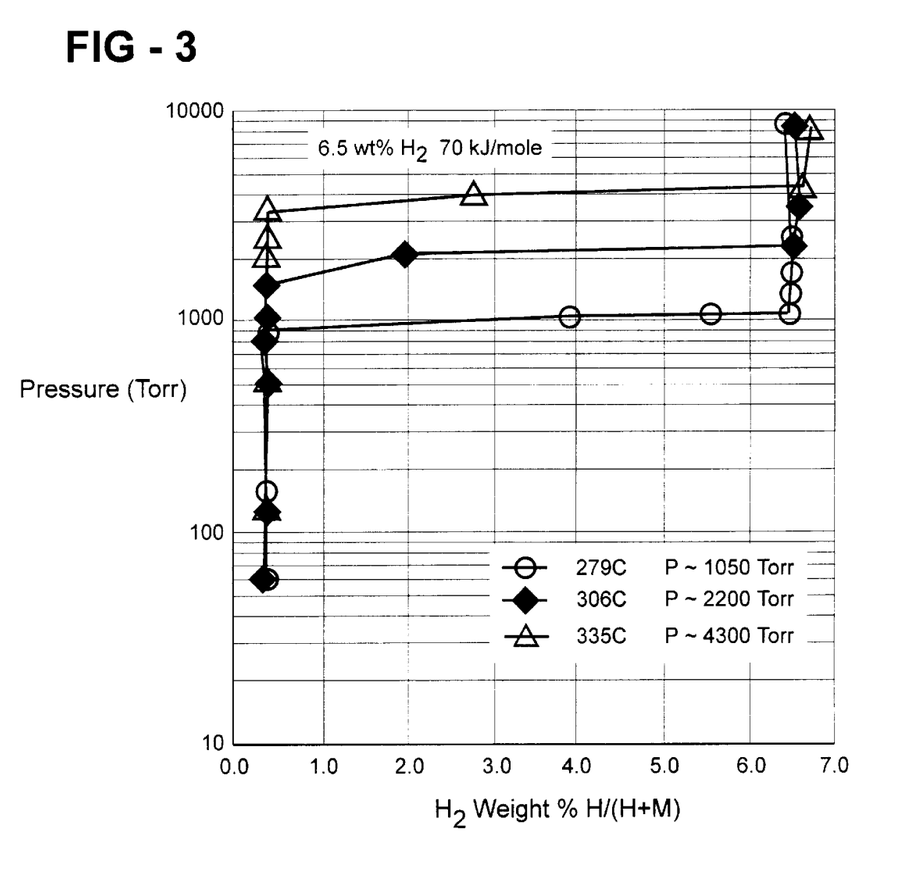
FIG. 3 is a graph of the Pressure Composition Temperature (PCT) curves of alloy FC-10 at 3 different tempertaures.

FIG. 3 is a graph of the Pressure-Composition -Temperature (PCT) curves of alloy FC-10 at 279° C. (represented by the ○ symbol),306° C. (represented by the ▲ symbol) and 335° C. (represented by the Δ symbol). The graph shows that the alloy has plateau pressures of 1050 Torr at 279° C., 2200 Torr at 306° C. and 4300 Torr at 335° C. The PCT curve shows that the FC-10 alloy has a maximum capacity of about 6.5 weight % hydrogen, and a hydrogen bond energy of about 70 kJ/mole.

Figure 4:
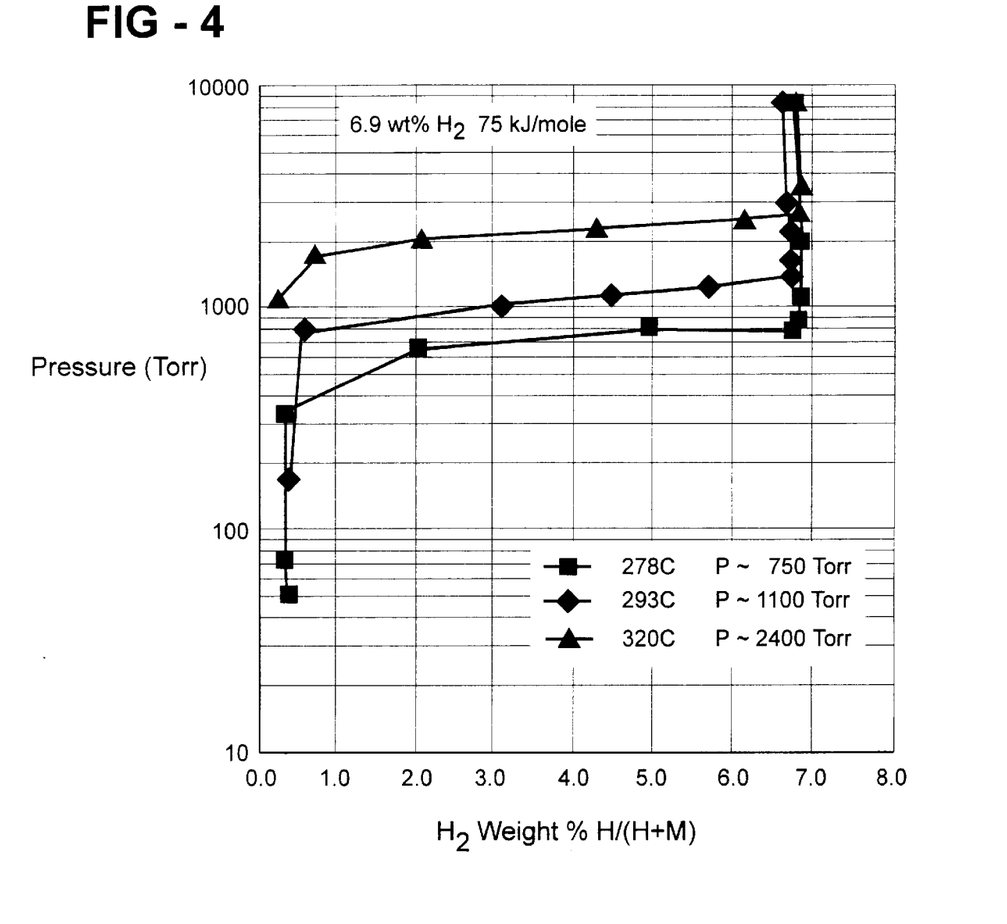
FIG. 4 is a graph of the PCT curves of alloy FC-76 at 3 different temperatures.

FIG. 4 is a graph of the PCT curves of alloy FC-76 at 278° C. (represented by the ■ symbol), 293° C. (represented by the ♦ symbol) and 320° C. (represented by the ▲ symbol). The graph shows that the alloy has plateau pressures of 750 Torr at 278° C., 1100 Torr at 293° C. and 2400 Torr at 320° C. The PCT curve shows that the FC-76 alloy has a maximum capacity of about 6.9 weight % hydrogen, and a hydrogen bond energy of about 75 kJ/mole.

Figure 5:
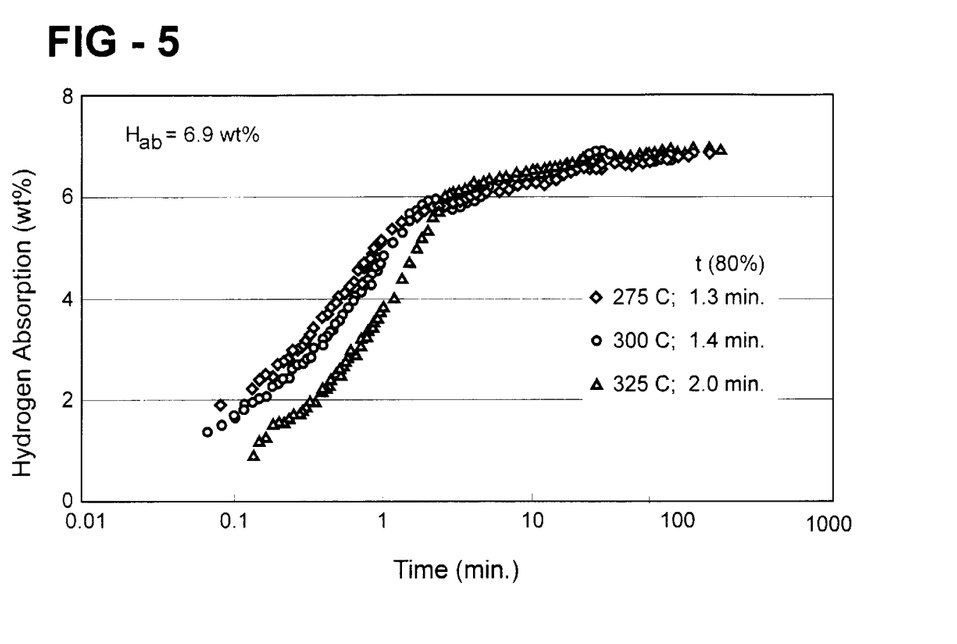
FIG. 5 is a plot of the absorption kinetics of the FC-76 alloy, specifically plotted is weight % hydrogen absorption versus time for 3 different temperatures.

FIG. 5 is a plot of the absorption kinetics of the FC-76 alloy. Specifically, weight % hydrogen absorption versus time is plotted for 3 temperatures 275° C. (◇ symbol), 300° C. (○ symbol), and 325° C. (Δ symbol). As can be seen, at 275° C. the alloy absorbs 80% of it's total capacity in 1.3 minutes, at 300° C. the alloy absorbs 80% of it's total capacity in 1.4 minutes, and at 325° C. the alloy absorbs 80% of it's total capacity in 2.0 minutes.

Figure 6:
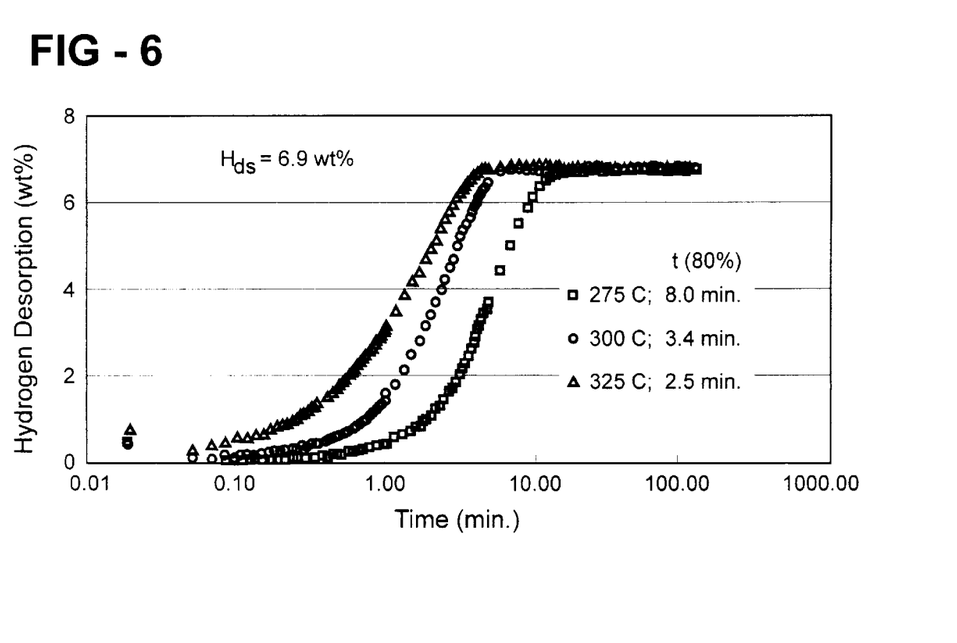
FIG. 6 is a plot of the desorption kinetics of the FC-76 alloy specifically plotted is weight % hydrogen desorption versus time for 3 different temperatures.

FIG. 6 is a plot of the desorption kinetics of the FC-76 alloy. Specifically, weight % hydrogen desorption versus time is plotted for 3 temperatures 275° C. (□ symbol), 300° C. (○ symbol), and 325° C. (Δ symbol). As can be seen, at 275° C. the alloy desorbs 80% of its total capacity in 8.0 minutes, at 300° C. the alloy desorbs 80% of it's total capacity in 3.4 minutes, and at 325° C. the alloy debsorbs 80% of it's total capacity in 2.5 minutes.

Figure 7:
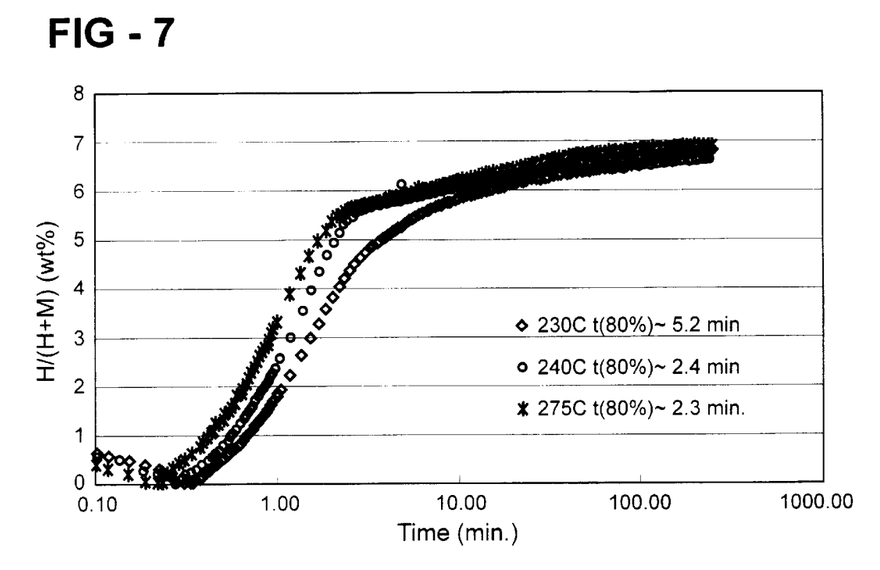
FIG. 7 is a plot of the absorption kinetics of the FC-86 alloy specifically plotted is weight % hydrogen desorption versus time for 3 different temperatures.

FIG. 7 is a plot of the absorption kinetics of the FC-86 alloy. Specifically, weight % hydrogen absorption versus time is plotted for 3 temperatures 230° C. (◇ symbol), 240° C. (○ symbol), and 275° C. (* symbol). As can be seen, at 230° C. the alloy absorbs 80% of it's total capacity in 5.2 minutes, at 300° C. the alloy absorbs 80% of it's total capacity in 2.4 minutes, and at 325° C. the alloy absorbs 80% of it's total capacity in 2.3 minutes.

Figure 8:
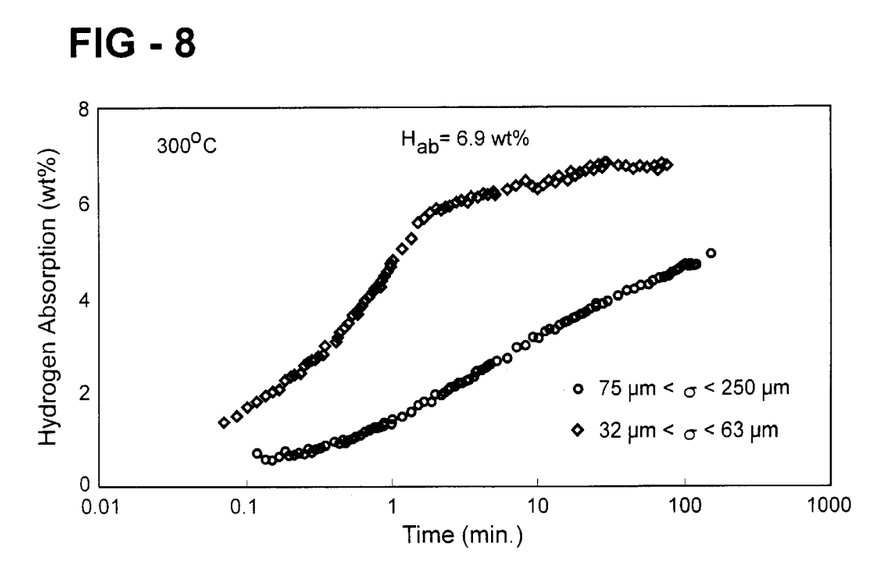
FIG. 8 is a plot of the absorption kinetics of FC-76 alloy powders having two different particle sizes.

FIG. 8 is a plot of the absorption kinetics of FC-76 alloy powders having two different particle sizes. Specifically, weight % hydrogen absorption versus time is plotted for material having a particle size range of 75–250 microns (○ symbol), and 32–63 microns (◇ symbol). As can be seen, the smaller particle size greatly enhances the absorption kinetics.

While the method of forming the instant powders in the examples above was rapid solidification and subsequent grinding, gas atomization may also be used. When the materials are ground, use of an attritor is the preferred method of grinding. Particularly useful is the addition of a grinding agent, such as carbon, when grinding these alloys.

The present invention includes a metal hydride hydrogen storage means for storing hydrogen within a container or tank. In one embodiment of the present invention, the storage means comprises a the afore described hydrogen storage alloy material physically bonded to a support means. Generally, the support means can take the form of any structure that can hold the storage alloy material. Examples of support means include, but are not limited to, mesh, grid, matte, foil, foam and plate. Each may exist as either a metal or non-metal.

The support means may be formed from a variety of materials with the appropriate thermodynamic characteristics that can provide the necessary heat transfer mechanism. These include both metals and non-metals. Preferable metals include those from the group consisting of Ni, Al, Cu, Fe and mixtures or alloys thereof. Examples of support means that can be formed from metals include wire mesh, expanded metal and foamed metal.

The hydrogen storage alloy material may be physically bonded to the support means by compaction and/or sintering processes. The alloy material is first converted into a fine powder. The powder is then compacted onto the support means. The compaction process causes the powder to adhere to and become an integral part of the support means. After compaction, the support means that has been impregnated with alloy powder is preheated and then sintered. The preheating process liberates excess moisture and discourages oxidation of the alloy powder. Sintering is carried out in a high temperature, substantially inert atmosphere containing hydrogen. The temperature is sufficiently high to promote particle-to-particle bonding of the alloy material as well as the bonding of the alloy material to the support means.

Figure 9:
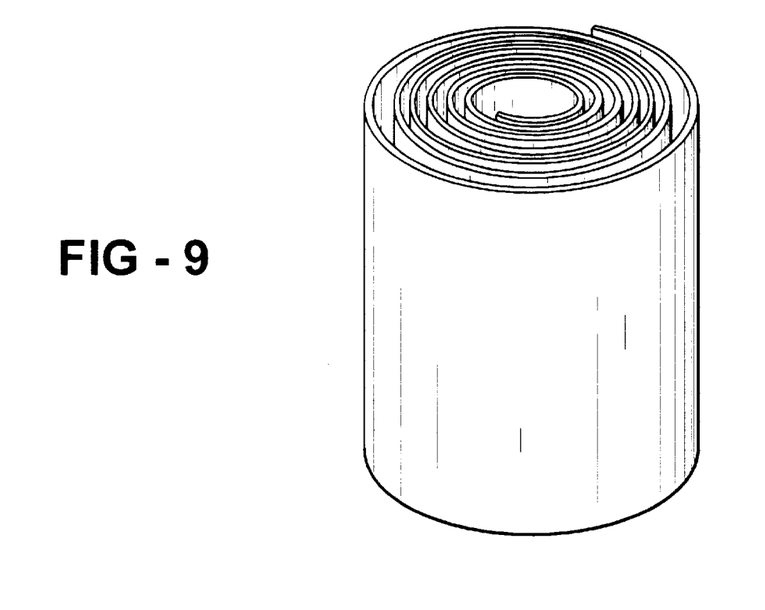
FIG. 9 shows an embodiment of the instant invention where a support means bonded with the hydrogen storage alloy material is spirally wound into a coil.
Figure 10:
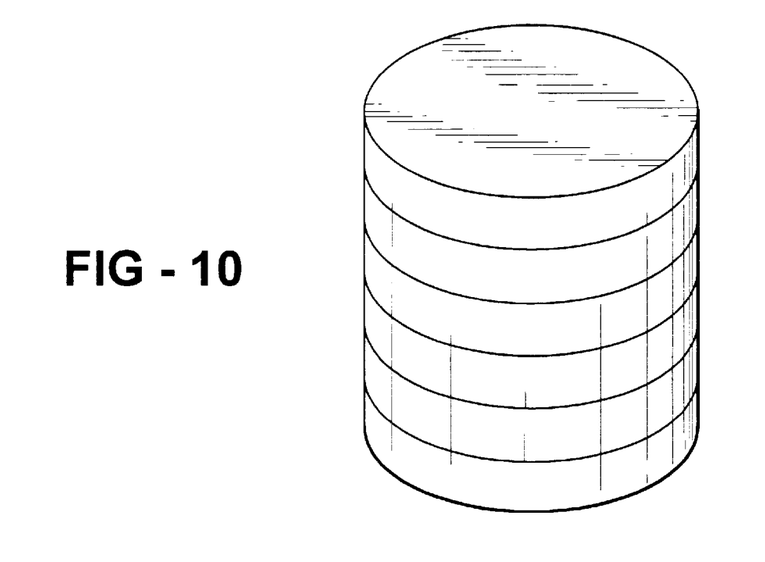
FIG. 10 shows an alternate embodiment of the instant invention where a support means bonded with the hydrogen storage alloy material is assembled as a plurality of stacked disks.

The support means/alloy material can be packaged within the container/tank in many different configurations. FIG. 9 shows a configuration where the support means/alloy material is spirally wound into a coil. FIG. 10 shows an alternate configuration where the support means/alloy material is assembled in the container as a plurality of stacked disks. Other configurations are also possible (e.g. stacked plates).

Compacting and sintering alloy material onto a support means increases the packing density of the alloy material, thereby improving the thermodynamic and kinetic characteristics of the hydrogen storage system. The close contact between the support means and the alloy material improves the efficiency of the heat transfer into and out of the hydrogen storage alloy material as hydrogen is absorbed and desorbed. In addition, the uniform distribution of the support means throughout the interior of the container provides for an even temperature and heat distribution throughout the bed of alloy material. This results in a more uniform rates of hydrogen absorption and desorption throughout the entirety thereof, thus creating a more efficient energy storage system.

One problem when using just alloy powder (without a support means) in hydrogen storage beds is that of of self-compaction due to particle size reduction. That is, during repeated hydriding and dehydriding cycles, the alloy materials expand and contract as they absorb and desorb hydrogen. Some alloy materials have been found to expand and contract by as much as 25% in volume as a result of hydrogen introduction into and release from the material lattice. As a result of the dimensional change in the alloy materials, they crack, undergo fracturing and break up into finer and finer particles. After repeated cycling, the fine particles self-compact causing inefficient hydrogen transfer as well as high stresses that are directed against the walls of the storage container.

However, the processes used to attach the alloy material onto the support means keeps the alloy particles firmly bonded to each other as well as to the support means during the absorption and desorption cycling. Furthermore, the tight packaging of the support means within the container serves as a mechanical support that keeps the alloy particles in place during the expansion, contraction and fracturing of the material.

The instant alloys and storage material systems are useful as hydrogen supplies for many applications. One such application is the field of automobiles. Specifically, the systems can be used as a source of hydrogen for internal combustion engine (ICE) vehicles or fuel cell (FC) vehicles.

Figure 11:
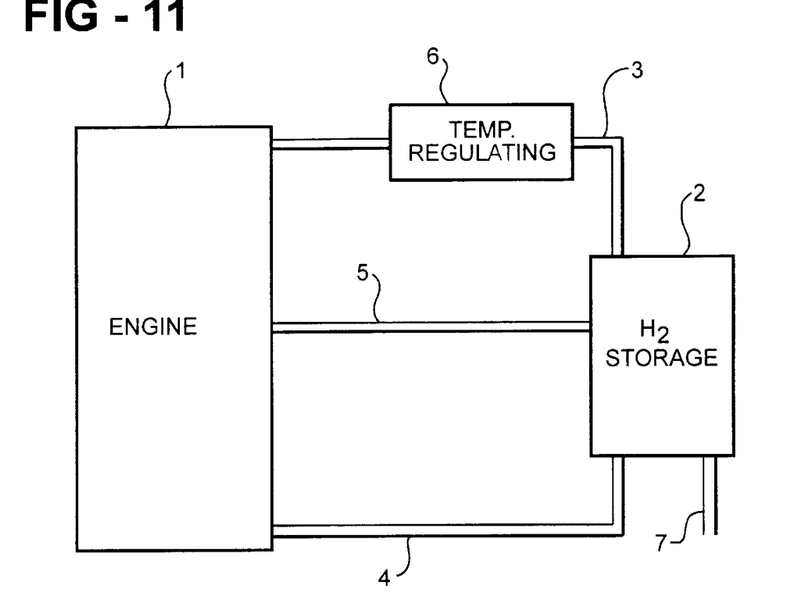
FIG. 11, shows a schematic representation of a hydrogen gas supply system which utilizes the alloy of the instant invention for powering an internal combustion engine vehicle.

FIG. 11 shows a schematic representation of a hydrogen gas supply system for an ICE vehicle, which is for supplying a hydrogen engine 1 with hydrogen gas. The system has a hydrogen gas storage portion 2 and an engine waste heat transfer supply passage 3 which leads engine waste heat (in the form of exhaust gas or engine coolant) discharged from the engine 1 to the hydrogen gas storage portion 2. The system also includes a return passage 4 for returning any engine coolant used to heat the hydrogen storage material back to the engine 1 and an exhaust gas vent 7 for releasing used exhaust gas. The system further includes a hydrogen gas supply passage 5 which leads hydrogen gas from the hydrogen gas storage portion 2 to the engine 1. The engine waste heat transfer supply passage 3 is provided with a temperature regulating portion 6 which regulates the temperature of the waste heat to be introduced into the hydrogen gas storage portion 2. With such a system, waste heat generated within the ICE can be efficiently used to heat the hydrogen storage material to release hydrogen therefrom for use in the ICE.

Figure 12:
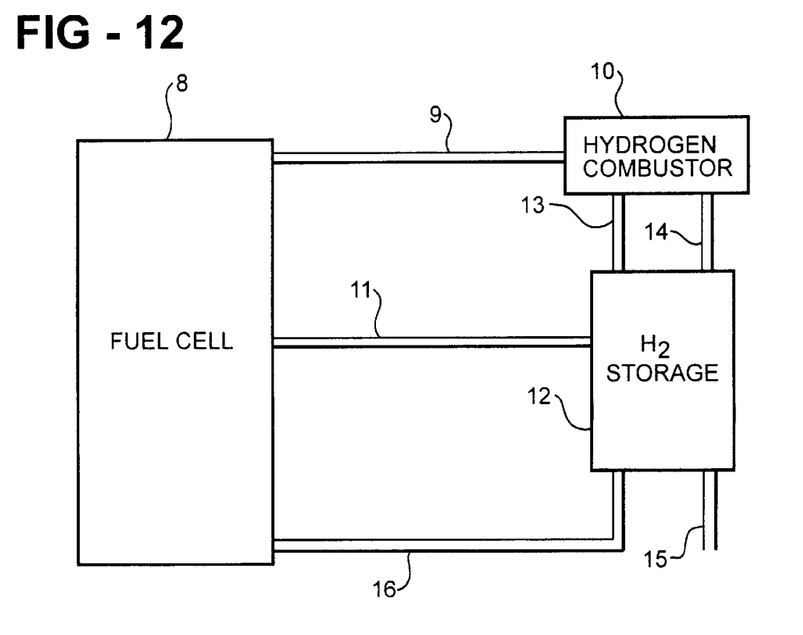
FIG. 12, shows a schematic representation of a hydrogen gas supply system which utilizes the alloy of the instant invention for powering for a fuel cell vehicle.

FIG. 12 shows a schematic representation of a hydrogen gas supply system for an FC vehicle, which is for supplying a fuel cell 8 with hydrogen gas. The system has a hydrogen gas storage portion 12 and a fuel cell waste heat/hydrogen transfer supply passage 9 which leads fuel cell waste heat and unused hydrogen discharged from the fuel cell 8 to a hydrogen gas combustor 10. Waste heat from the fuel cell may be in the form of heated gases or heated aqueous electrolyte. The hydrogen combustor 10, heats a thermal transfer medium (preferably in the form of the aqueous electrolyte from the fuel cell) utilizing waste heat from the fuel cell 8, and by combusting hydrogen. Hydrogen is supplied to the combustor 10 via unused hydrogen from the fuel cell 8, and via fresh hydrogen supplied from the hydrogen storage unit 12 via hydrogen supply line 14. Heated thermal transfer medium is supplied to the hydrogen storage unit 12 via supply line 13. The system also includes a return passage 16 for returning any fuel cell aqueous electrolyte used to heat the hydrogen storage material back to the fuel cell 8 and an exhaust gas vent 15 for releasing used combustor gas. The system further includes a hydrogen gas supply passage 11 which leads hydrogen gas from the hydrogen gas storage unit 12 to the fuel cell 8.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. In a hydrogen powered vehicle system, said system including:
   at least one of an internal combustion engine fueled by hydrogen or a fuel cell; and
   a hydrogen storage means operatively interconnected to said internal combustion engine or said fuel cell, the improvement comprising said hydrogen storage means including a hydrogen storage alloy powder characterized in that said alloy powder has:
   a) a hydrogen storage capacity of at least 6 weight %; and
   b) absorption kinetics such that the alloy powder absorbs 80% of it's total capacity within 5 minutes at 300° C.

2. The hydrogen powered vehicle system of claim 1, wherein said alloy includes at least 90 weight % magnesium.

3. The hydrogen powered vehicle system of claim 1, wherein said alloy has a hydrogen storage capacity of at least 6.5 weight %.

4. The hydrogen powered vehicle system of claim 3, wherein said alloy has absorption kinetics such that the alloy powder absorbs 80% of it's total capacity within 2 minutes at 300° C.

5. The hydrogen powered vehicle system of claim 1, wherein said alloy has a hydrogen storage capacity of at least 6.9 weight %.

6. The hydrogen powered vehicle system of claim 5, wherein said alloy has absorption kinetics such that the alloy powder absorbs 80% of it's total capacity within 1.5 minutes at 300° C.

7. The hydrogen powered vehicle system of claim 2, wherein said alloy further includes 0.5–2.5 weight % nickel.

8. The hydrogen powered vehicle system of claim 4, wherein said alloy further includes 0.5–2.5 weight % nickel.

9. The hydrogen powered vehicle system of claim 6, wherein said alloy further includes 0.5–2.5 weight % nickel.

10. The hydrogen powered vehicle system of claim 7, wherein said alloy further includes 1.0–4.0 weight % Misch metal.

11. The hydrogen powered vehicle system of claim 8, wherein said alloy further includes 1.0–4.0 weight % Misch metal.

12. The hydrogen powered vehicle system of claim 9, wherein said alloy further includes 1.0–4.0 weight % Misch metal.

13. The hydrogen powered vehicle system of claim 10, wherein said Misch metal comprises predominantly Ce, La and Pr.

14. The hydrogen powered vehicle system of claim 11, wherein said Misch metal comprises predominantly Ce, La and Pr.

15. The hydrogen powered vehicle system of claim 12, wherein said Misch metal comprises predominantly Ce, La and Pr.

16. The hydrogen powered vehicle system of claim 13, wherein said alloy further includes one or more from the group consisting of 3–7 weight % Al, 0.1–1.5 weight % Y and 0.3–1.5 weight % silicon.

17. The hydrogen powered vehicle system of claim 14, wherein said alloy further includes one or more from the group consisting of 3–7 weight % Al, 0.1–1.5 weight % Y and 0.3–1.5 weight % silicon.

18. The hydrogen powered vehicle system of claim 15, wherein said alloy further includes one or more from the group consisting of 3–7 weight % Al, 0.1–1.5 weight % Y and 0.3–1.5 weight % silicon.

19. The hydrogen powered vehicle system of claim 2, wherein said alloy comprises 91.0 wt. % Mg, 0.9 wt. % Ni, 5.6 wt. % Al, 0.5 wt. % Y and 2.0 at % Misch metal.

20. The hydrogen powered vehicle system of claim 2, wherein said alloy comprises 95.6 wt. % Mg, 1.6 wt. % Ni, 0.8 wt. % Si and 2.0 wt % Misch metal.

21. The hydrogen powered vehicle system of claim 2, wherein said alloy comprises 95 wt. % Mg, 2 wt. % Ni and 3.0 wt % Misch metal.

22. The hydrogen powered vehicle system of claim 1, wherein said hydrogen storage alloy powder is physically bonded to a support means to form a hydrogen storage means.

23. The hydrogen powered vehicle system of claim 22, wherein hydrogen storage alloy powder is physically bonded to said support means by compaction and/or sintering.

24. The hydrogen powered vehicle system of claim 22, wherein said support means comprises at least one selected from the group consisting of mesh, grid, matte, foil, foam and plate.

25. The hydrogen powered vehicle system of claim 22, wherein said support means is formed from a metal.

26. The hydrogen powered vehicle system of claim 25, wherein said support means is formed from one or more metals selected from the group consisting of Ni, Al, Cu, Fe and mixtures or alloys thereof.

27. The hydrogen powered vehicle system of claim 22, wherein said hydrogen storage means comprises said hydrogen storage alloy powder physically bonded to said support means and spirally wound into a coil.

28. The hydrogen powered vehicle system of claim 22, wherein said hydrogen storage means comprises said hydrogen storage alloy powder physically bonded to said support means, a plurality of which are stacked as disks or plates.

29. The hydrogen powered vehicle system of claim 1, wherein said hydrogen storage alloy powder has a particle size range of between 30 and 70 microns.

30. A magnesium based hydrogen storage alloy powder, said alloy comprising at least 90 weight % magnesium, said alloy powder having:
   a) a hydrogen storage capacity of at least 6 weight %; and
   b) absorption kinetics such that the alloy powder absorbs 80% of it's total capacity within 5 minutes at 300° C.

31. The magnesium based hydrogen storage alloy powder of claim 30, wherein said alloy has a hydrogen storage capacity of at least 6.5 weight %.

32. The magnesium based hydrogen storage alloy powder of claim 31, wherein said alloy has absorption kinetics such that the alloy powder absorbs 80% of it's total capacity within 2 minutes at 300° C.

33. The magnesium based hydrogen storage alloy powder of claim 30, wherein said alloy has a hydrogen storage capacity of at least 6.9 weight %.

34. The magnesium based hydrogen storage alloy powder of claim 33, wherein said alloy has absorption kinetics such that the alloy powder absorbs 80% of it's total capacity within 1.5 minutes at 300° C.

35. The magnesium based hydrogen storage alloy powder of claim 30, wherein said alloy further includes 0.5–2.5 weight % nickel.

36. The magnesium based hydrogen storage alloy powder of claim 32, wherein said alloy further includes 0.5–2.5 weight % nickel.

37. The magnesium based hydrogen storage alloy powder of claim 32, wherein said alloy further includes 0.5–2.5 weight % nickel.

38. The magnesium based hydrogen storage alloy powder of claim 33, wherein said alloy further includes 1.0–4.0 weight % Misch metal.

39. The magnesium based hydrogen storage alloy powder of claim 36, wherein said alloy further includes 1.0–4.0 weight % Misch metal.

40. The magnesium based hydrogen storage alloy powder of claim 37, wherein said alloy further includes 1.0–4.0 weight % Misch metal.

41. The magnesium based hydrogen storage alloy powder of claim 40, wherein said hydrogen storage alloy powder has a particle size range of between 30 and 70 microns.

42. The magnesium based hydrogen storage alloy powder of claim 38, wherein said Misch metal comprises predominantly Ce, La and Pr.

43. The magnesium based hydrogen storage alloy powder of claim 39, wherein said Misch metal comprises predominantly Ce, La and Pr.

44. The magnesium based hydrogen storage alloy powder of claim 40, wherein said Misch metal comprises predominantly Ce, La and Pr.

45. The magnesium based hydrogen storage alloy powder of claim 42, wherein said alloy further includes one or more from the group consisting of 3–7 weight % Al, 0.1–1.5 weight % Y and 0.3–1.5 weight % silicon.

46. The magnesium based hydrogen storage alloy powder of claim 43, wherein said alloy further includes one or more from the group consisting of 3–7 weight % Al, 0.1–1.5 weight % Y and 0.3–1.5 weight % silicon.

47. The magnesium based hydrogen storage alloy powder of claim 44, wherein said alloy further includes one or more from the group consisting of 3–7 weight % Al, 0.1–1.5 weight % Y and 0.3–1.5 weight % silicon.

48. The magnesium based hydrogen storage alloy powder of claim 30, wherein said alloy comprises 91.0 wt. % Mg, 0.9 wt. % Ni, 5.6 wt. % Al, 0.5 wt. % Y and 2.0 at % Misch metal.

49. The magnesium based hydrogen storage alloy powder of claim 30, wherein said alloy comprises 95.6 wt. % Mg, 1.6 wt. % Ni, 0.8 wt. % Si and 2.0 wt % Misch metal.

50. The magnesium based hydrogen storage alloy powder of claim 30, wherein said alloy comprises 95 wt. % Mg, 2 wt. % Ni and 3.0 wt % Misch metal.

51. The magnesium based hydrogen storage alloy powder of claim 30, wherein said hydrogen storage alloy powder is physically bonded to a support means to form a hydrogen storage means.

52. The magnesium based hydrogen storage alloy powder of claim 51, wherein hydrogen storage alloy powder is physically bonded to said support means by compaction and/or sintering.

53. The magnesium based hydrogen storage alloy powder of claim 51, wherein said support means comprises at least one selected from the group consisting of mesh, grid, matte, foil, foam and plate.

54. The magnesium based hydrogen storage alloy powder of claim 51, wherein said support means is formed from a metal.

55. The magnesium based hydrogen storage alloy powder of claim 54, wherein said support means is formed from one or more metals selected from the group consisting of Ni, Al, Cu, Fe and mixtures or alloys thereof.

56. The magnesium based hydrogen storage alloy powder of claim 51, wherein said hydrogen storage means comprises said hydrogen storage alloy powder physically bonded to said support means and spirally wound into a coil.

57. The magnesium based hydrogen storage alloy powder of claim 51, wherein said hydrogen storage means comprises said hydrogen storage alloy powder physically bonded to said support means, a plurality of which are stacked as disks or plates.

58. The magnesium based hydrogen storage alloy powder of claim 56, wherein said hydrogen storage means is capable of supplying hydrogen to an internal combustion engine to power a vehicle.

59. The magnesium based hydrogen storage alloy powder of claim 57, wherein said hydrogen storage means is capable of supplying hydrogen to an internal combustion engine to power a vehicle.

60. The magnesium based hydrogen storage alloy powder of claim 56, wherein said hydrogen storage means is capable of supplying hydrogen to a fuel cell to power a vehicle.

61. The magnesium based hydrogen storage alloy powder of claim 57, wherein said hydrogen storage means is capable of supplying hydrogen to a fuel cell to power a vehicle.

62. The magnesium based hydrogen storage alloy powder of claim 30, wherein said magnesium based hydrogen storage alloy is capable of supplying hydrogen to an internal combustion engine to power a vehicle.

63. The magnesium based hydrogen storage alloy powder of claim 30, wherein said magnesium based hydrogen storage alloy is capable of supplying hydrogen to a fuel cell to power a vehicle.

* * * * *